United States Patent
Cho et al.

(10) Patent No.: US 11,278,896 B2
(45) Date of Patent: Mar. 22, 2022

(54) MICROFLUIDIC DEVICE AND CONTROL EQUIPMENT FOR MICROFLUIDIC DEVICE

(71) Applicants: UNIST (ULSAN NATIONAL INSTITUTE OF SCIENCE AND TECHNOLOGY), Ulsan (KR); CLINOMICS CO., Ulsan (KR)

(72) Inventors: Yoon Kyoung Cho, Ulsan (KR); Kyusang Lee, Ulsan (KR); Yongjin Lee, Namyangju-si (KR)

(73) Assignee: UNIST(ULSAN NATIONAL INSTITUTE OF SCIENCE AND TECHNOLOGY), Ulsan (KR)

( * ) Notice: Subject to any disclaimer, the term of this patent is extended or adjusted under 35 U.S.C. 154(b) by 42 days.

(21) Appl. No.: 16/758,123

(22) PCT Filed: Dec. 22, 2017

(86) PCT No.: PCT/KR2017/015395
§ 371 (c)(1),
(2) Date: Apr. 22, 2020

(87) PCT Pub. No.: WO2019/083091
PCT Pub. Date: May 2, 2019

(65) Prior Publication Data
US 2020/0282398 A1   Sep. 10, 2020

(30) Foreign Application Priority Data
Oct. 27, 2017   (KR) .......................... 10-2017-0141393

(51) Int. Cl.
*B01L 3/00* (2006.01)
(52) U.S. Cl.
CPC ... *B01L 3/502738* (2013.01); *B01L 3/502715* (2013.01); *B01L 2300/041* (2013.01);
(Continued)

(58) Field of Classification Search
CPC ......... B01L 3/502738; B01L 3/502715; B01L 3/5027; B01L 3/502; B01L 3/50;
(Continued)

(56) References Cited

U.S. PATENT DOCUMENTS

2005/0153430 A1   7/2005   Ohtaka

FOREIGN PATENT DOCUMENTS

| CN | 106163978 | 11/2016 | |
| EP | 3 020 682 A1 * | 5/2016 | ............... B81C 5/00 |

(Continued)

OTHER PUBLICATIONS

KR 10-1347373 B1, English Machine Translation of Description, obtained from espacenet.com on Aug. 19, 2021. (Year: 2021).*
(Continued)

*Primary Examiner* — Christine T Mui
(74) *Attorney, Agent, or Firm* — Lex IP Meister, PLLC (57) ABSTRACT

Provided is a microfluidic device to more easily and effectively operate a valve by improving the structure of valves for controlling a fluid flow more simply and efficiently, which comprises a platform having at least one chamber, at least one flow channel connected to the chambers and transfer fluid, and a valve which opens or closes the flow channel, wherein the valve comprises a body installed in the platform, a blocking plate installed in the body and positioned to face the flow channel to selectively blocks the flow channel, a pressing rod installed to be movable at the inside of the body to press the blocking plate, and a fixing unit installed at the body and fix the pressing rod at a blocking plate pressing position.

15 Claims, 4 Drawing Sheets

(52) U.S. Cl.
CPC ... *B01L 2300/06* (2013.01); *B01L 2300/0806* (2013.01); *B01L 2300/123* (2013.01); *B01L 2400/06* (2013.01)

(58) Field of Classification Search
CPC .......... B01L 2300/041; B01L 2300/06; B01L 2300/0806; B01L 2300/123; B01L 2400/06
USPC ................................. 422/504, 502, 501, 500
See application file for complete search history.

(56) References Cited

FOREIGN PATENT DOCUMENTS

| | | |
|---|---|---|
| EP | 3020682 | 5/2016 |
| GB | 2516671 | 2/2015 |
| JP | 2003-047178 | 2/2003 |
| JP | 2003-084001 | 3/2003 |
| JP | 2003-525101 | 8/2003 |
| JP | 2003-340797 | 12/2003 |
| JP | 2005-176836 | 7/2005 |
| JP | 2008-180641 | 8/2008 |
| JP | 2016-536619 | 11/2016 |
| KR | 10-1347373 B1 * | 12/2013 ............. G01N 35/08 |
| KR | 10-1347373 | 1/2014 |
| KR | 10-2014-0072706 | 6/2014 |
| KR | 10-1439483 | 9/2014 |
| KR | 10-2016-0031778 | 3/2016 |
| KR | 10-2017-0047178 | 5/2017 |
| WO | 2000-013795 | 3/2000 |
| WO | 2015-015181 | 2/2015 |

OTHER PUBLICATIONS

SIPO, Search Report of CN 201780096227.2 dated Jun. 24, 2021.
EPO, Search Report of EP 17930039.7 dated Jul. 20, 2021.

* cited by examiner

MICROFLUIDIC DEVICE AND CONTROL EQUIPMENT FOR MICROFLUIDIC DEVICE

CROSS-REFERENCE TO RELATED APPLICATION

This application claims priority to and the benefit of Korean Patent Application No. 10-2017-0141393 filed in the Korean Intellectual Property Office on Oct. 27, 2017, the entire contents of which are incorporated herein by reference.

BACKGROUND OF THE INVENTION

(a) Field of the Invention

The present invention relates to a microfluidic device and a control equipment for the microfluidic device to control a fluid flow.

(b) Description of the Related Art

A microfluidic device performs a unit operation by controlled flow of liquids in a small scale. Valves help combine those unit operations to integrate more complex functions in a single device by controlling chambers which contain fluids.

The valve is one of the most important elements for fluid control in research which uses a microfluidic.

The fluid flow can be controlled by operating valves.

Through this, it is possible to integrate a number of functions on a single chip.

Recently, valves that can control fluid flow on a disk by applying elastic materials are being developed.

This type of valve is capable of delivering reliable open and close operations, and can be more effective in controlling fluid flow.

Various approaches to develop valves that can control fluid flow more effectively have been tried.

An inefficiently designed valve can impose a major problem, such as the development of point-of-care diagnosis devices that require automation of the entire process from sample injection to outcome detection.

Thus, a more robust structure of the valve is required within a microfluidic device.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a microfluidic device and control equipment for microfluidic device having advantages of effective operating of valve and easy controlling of flow channel.

An exemplary embodiment of the present invention provides a microfluidic device comprising a platform having at least one chamber, at least one flow channel connected to the chambers and transfer fluid, and a valve which opens or closes the flow channel, wherein the valve comprises a body installed in the platform, a blocking plate installed in the body and positioned to face the flow channel to selectively blocks the flow channel, a pressing rod installed to be movable at the inside of the body to press the blocking plate, and a fixing unit installed at the body and fix the pressing rod at a blocking plate pressing position.

Another embodiment of the present invention provides a control equipment for microfluidic device comprising a platform having at least one chamber, at least one flow channel connected to the chambers and transfer fluid, and a valve which opens or closes the flow channel, wherein the valve comprises a body installed in the platform, a blocking plate installed in the body and positioned to face the flow channel to selectively blocks the flow channel, a pressing rod installed to be movable at the inside of the body to press the blocking plate, and an elastic latch installed at the side of the body, wherein a front end of the elastic latch elastically protrudes towards inside the body to latch a front end of the pressing rod for fixing the pressing rod, wherein the control equipment further comprises a valve operation unit for opening and closing the valves equipped with the microfluidic device, and a moving unit for moving the valve operation unit, wherein the valve operation unit comprises a pressing unit that is configured to apply external force to the pressing rod of the valve so that the pressing rod is locked by the elastic latch and fixed, and releasing unit configured to release the pressing rod from fixed condition.

According to an embodiment of the present invention, the actuation of valves that control the fluid flow will be improved, thus it is more effective to operate valves. And as the structure of the valve is simple, it is easy to manufacture and convenient to use.

Technical Problem

A microfluidic device and a control equipment for the microfluidic device which has a simple and efficient improvement in the structure of the valves that control fluids are provided.

A microfluidic device and a control equipment for the microfluidic device which is configured to easily and effectively operate a valve are provided.

Technical Solution

A microfluidic device in this embodiment may comprise a platform having at least one chamber, at least one flow channel connected to the chambers and transfer fluid, and a valve which opens or closes the flow channel.

The valve may comprise a body installed in the platform, a blocking plate installed in the body and positioned to face the flow channel to selectively blocks the flow channel, a pressing rod installed to be movable at the inside of the body to press the blocking plate, and a fixing unit installed at the body and fix the pressing rod at a blocking plate pressing position.

The microfluidic device may further comprise a protrusion that protrudes from the lower end of the body and presses the blocking plate against the platform to form a tight closure.

The fixing unit may comprise an elastic latch installed at the side of the body, wherein a front end of the elastic latch elastically protrudes towards inside the body to latch a front end of the pressing rod for fixing the pressing rod.

The front end of the pressing rod has a locking member which is configured to be locked by the elastic latch, and the diameter of the locking member is smaller than the internal diameter of the body and larger than the internal diameter of the elastic latch.

The pressing rod may further comprise a stepped holder which is formed on the side of the pressing rod and configured to be locked by elastic latch to prevent the escape of the pressing rod.

The control equipment for microfluidic device may further comprise a valve operation unit which opens and closes the flow channel by moving the pressing rod, wherein the valve operation unit may comprise a pressing unit that is configured to apply external force to the pressing rod of the valve so that the pressing rod is locked by the elastic latch and fixed, and releasing unit configured to release the pressing rod from fixed condition.

The pressing unit may comprise a housing located above the body and has an open bottom; an electromagnet installed within the housing, an electric current supplier that applies current to the electromagnet, and a magnetic material that is installed to be movable in the housing and push the pressing rod as it moves due to the magnetic force from the electromagnet to moves the pressing rod.

The diameter of lower end of the magnetic material is smaller than the diameter of the locking member of the pressing rod.

The releasing unit may comprise a driving unit which is connected to the housing and moves the housing toward inside of the body, wherein the diameter of lower end of the housing, which heads for the body, is equal or smaller than the internal diameter of the body and equal or larger than the diameter of the locking member of the pressing rod, thus the housing enlarges the elastic latch outward as the housing moves into the inside of the body.

The body may have a structure having a cylindrical shape.

The blocking plate may have a structure made of a material having elasticity, and which opens and closes the flow channel by being pressed and transformed by the pressing rod.

For example, the blocking plate may be formed of at least one material selected from polydimethylsiloxane (PDMS), polybutadiene, butyl, polyisoprene, chloroprene, elastic synthetic resin, rubber or silicone.

A control equipment for microfluidic device in this embodiment may comprise a platform having at least one chamber, at least one flow channel connected to the chambers and transfer fluid, and a valve which opens or closes the flow channel, wherein the valve comprises a body installed in the platform, a blocking plate installed in the body and positioned to face the flow channel to selectively blocks the flow channel, a pressing rod installed to be movable at the inside of the body to press the blocking plate, and an elastic latch installed at the side of the body, wherein a front end of the elastic latch elastically protrudes towards inside the body to latch a front end of the pressing rod for fixing the pressing rod.

The control equipment may further comprise a valve operation unit for opening and closing the valves equipped with the microfluidic device, and a moving unit for moving the valve operation unit, wherein the valve operation unit comprises a pressing unit that is configured to apply external force to the pressing rod of the valve so that the pressing rod is locked by the elastic latch and fixed, and releasing unit configured to release the pressing rod from fixed condition.

The pressing unit may comprise a housing located above the body and has an open bottom; an electromagnet installed within the housing; an electric current supplier that applies current to the electromagnet; and a magnetic material that is installed to be movable in the housing and push the pressing rod as it moves due to the magnetic force from the electromagnet to moves the pressing rod.

The diameter of lower end of the magnetic material is smaller than the diameter of the locking member of the pressing rod.

The releasing unit may comprise a driving unit which is connected to the housing and moves the housing toward inside of the body, wherein the diameter of lower end of the housing, which heads for the body, is equal or smaller than the internal diameter of the body and equal or larger than the diameter of the locking member of the pressing rod, thus the housing enlarges the elastic latch outward as the housing moves into the inside of the body.

Advantageous Effects

According to the embodiments, the actuation of valves that control the fluid flow will be improved, it is more effective to operate valves.

And as the structure of the valve is simple, it is easy to manufacture and convenient to use.

DETAILED DESCRIPTION OF THE EMBODIMENTS

Hereinafter, with reference to the attached drawings, embodiments of the present invention will be described so that a person ordinarily skilled in the art can readily conduct.

As can be readily appreciated by the person ordinarily skilled in the art, embodiments described below can be modified in various forms to the extent not departing from the spirit and scope of the invention.

Wherever possible, the same or similar parts are denoted using the same reference numerals in the drawings.

The terminology used below are merely to refer to a particular embodiment and are not intended to limit the present invention.

As used herein, the singular forms also include the plural forms unless the context clearly indicates otherwise.

The meaning of "comprising" or "including" as used in the specification embodies specific characteristics, regions, integers, steps, operations, elements, and/or components, and it does not exclude the presence or addition of other characteristics, regions, integers, steps, operations, elements, components, and/or groups.

All terms including technical and scientific terms used herein have the same meaning as commonly understood by those of ordinary skill in the art to which the present invention belongs.

Predefined terms are further interpreted as having a meaning consistent with the relevant technical literature and the present disclosure, and are not to be construed as ideal or very formal meanings unless defined otherwise.

Figure 1:
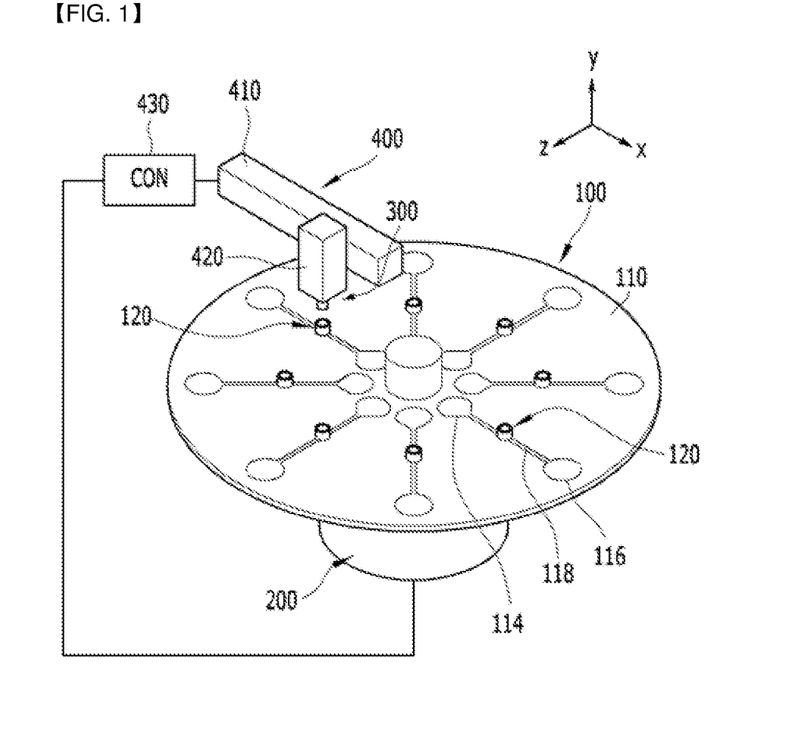
FIG. 1 is a schematic configuration of control equipment of microfluidic device according to the present embodiment.

FIG. 1 illustrates control equipment of microfluidic device according to the present embodiment.

The microfluidic device 100 in the present embodiment may comprise a platform 110 having a plurality of chambers 114 and 116, a plurality of flow channel 118 which connect between the chambers 114 and 116, and a valve 120 which selectively communicates between the chambers 114, 116 by opening or closing each flow channel 118.

The microfluidic device 100, for example, may be used to analyze the sample by being attached to the analysis system.

The analysis system may have a rotation operating unit 200 for rotating the platform of the microfluidic device, a light source which irradiates the light to the microfluidic device for analysis, and a spectroscope which analyzes the light passed through the microfluidic device.

The analysis system detects ingredients according to the color of the sample changed by the reagent by using the light source and the spectroscope.

According to the color of the analyte, a different wavelength appears in the spectroscope, and it is possible to detect the analyte by the detected wavelength.

In addition, if the concentration of analyte is high, the absorbance also increases in proportion to that. Thus, the concentration of the analyte can be detected based on the absorbance measured at the spectroscope.

The analysis system may further comprise a camera and a strobe light for monitoring.

The analysis system may be modified as a variety of configurations depending on the structure of the microfluidic device or the analyte, and it is not particularly limited.

The platform 110 has a center of rotation, for example, it may be formed of a rotatable circular plate.

The platform 110 may be formed by attaching two substrates to form the chambers 114, 116 and the flow channel 118.

Figure 2:
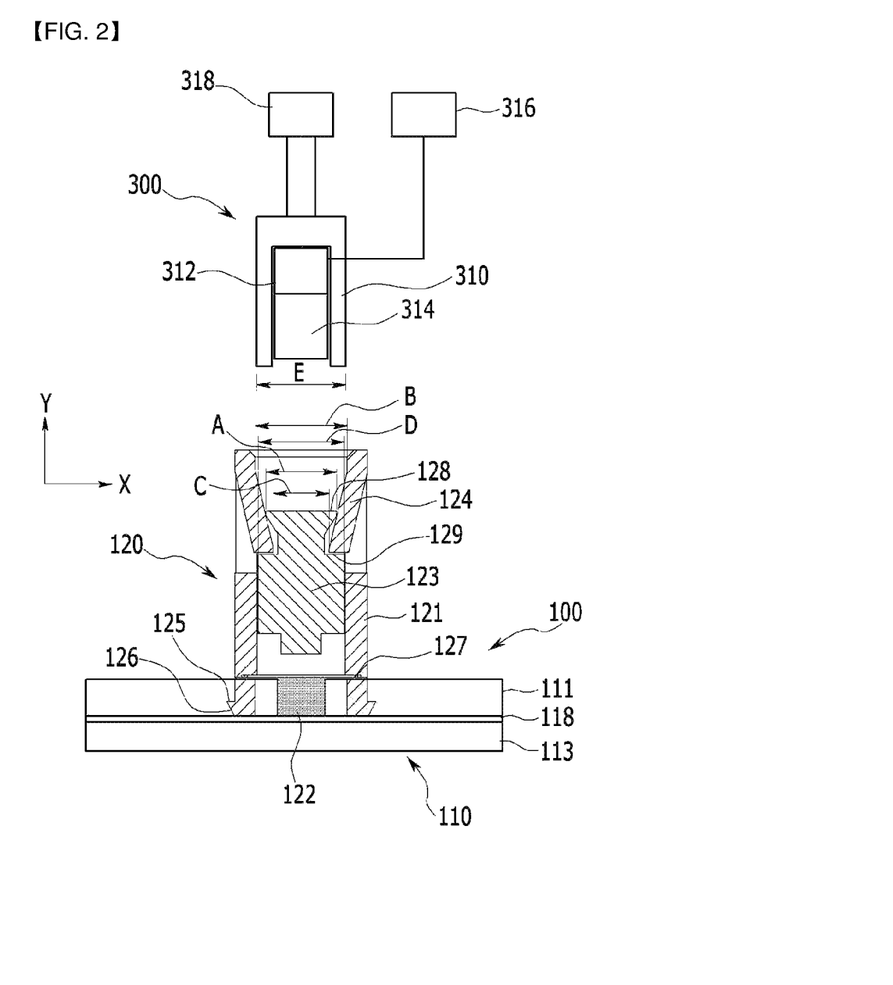
FIG. 2 is a schematic cross-sectional view illustrating the valve of the microfluidic device according to the present embodiment.

For convenience, hereinafter, as shown in FIG. 2, a substrate relatively disposed in the upper position along the y-axis direction is referred to the first substrate 111, and a substrate relatively disposed in the lower position is referred to the second substrate 113.

In this embodiment, the chambers 114, 116 which store fluid and the flow channel 118 which connects the chambers are formed inside the second substrate 113.

The first substrate 111 blocks the open top of the chambers 114, 116 and the flow channel 118 by being joined to the second substrate 113.

Of course, as opposed to the structure stated above, the chamber and the flow channel may be formed on the first substrate, and it is not particularly limited.

The first substrate 111 and the second substrate 113 form the platform 110 by being joined by various ways such as an adhesion by using an adhesive, an ultrasonic welding, a laser welding, or the likes.

Moreover, the platform 110 may be formed of a material having chemical and biological stability, and optical transparency.

In this embodiment, a blocking plate (see 122 in FIG. 2) for blocking the flow channel may be installed on the first substrate 111 in a position corresponding to the flow channel.

As it will be described in detail later.

Moreover, the first substrate 111 itself may be formed of elastically deformable material, so it can act as the blocking plate to block the flow channel.

When the platform 110 is rotated, the sample stored in the chamber 114 can be moved into the another chamber 116 through the flow channel by the centrifugal force.

The valve 120 installed between the chambers 114 and 116 controls the movement of the sample.

As described in FIG. 1, the control equipment which controls and drives the microfluidic device 100 comprises a valve operation unit 300 disposed outside the microfluidic device 100 to open and close at least any one of a plurality of valves installed in the platform 110.

The control equipment of this embodiment, may have a structure in which the valve operation unit 300 is installed separately from microfluidic device 100 to operate the valve 120 of the microfluidic device.

For such a structure, only one valve operation unit 300 may be installed in the control equipment.

By moving the position of the valve or the valve operation unit, each valve installed in the microfluidic device can be operated with one valve operation unit.

In addition to the above-mentioned structure, the control equipment may have a structure that the valve operation unit is equipped for each of the valve of the microfluidic device, so each valve can be operated individually by each valve operating unit.

In other words, a valve may have a structure that the valve operating unit for operating the valve is combined together with the valve.

The following description describes the structure, as an example, which the valve operation unit is equipped at the control equipment separately from the valve of the microfluidic device to operate and control the selected valve.

To this end, the control equipment of this embodiment may comprise a moving unit 400 to move the valve operation unit 300 to the position of selected valve 120.

The moving unit 400 may comprise a horizontal moving unit 410 arranged in a horizontal direction toward the center of the platform 110 and horizontally moves the valve operation unit 300.

Moreover, the moving unit 400 may further comprise a vertical moving unit 420 arranged in a vertical direction against the platform 110 and moves up and down the valve operation unit 300 against the platform 110.

The valve operation unit 300 is connected to the vertical moving unit 420 and moves up and down, and the vertical moving unit 420 is connected to the horizontal moving unit 410 and horizontally moves.

Therefore, the valve operation unit 300 can be moved to the required position by driving the horizontal moving unit 410 and/or the vertical moving unit 420.

The vertical moving unit 420 and the horizontal moving unit 410 are connected to the controller 430 and are driven by the control signal from the controller 430 to move the valve operation unit to the upper side of the selected valve.

The controller 430 of the control equipment controls the amount of rotation of the platform 110 by controlling rotation operating unit 200.

Thus, the valve 120 selected from the plurality of valves 120 provided in the platform 110 can be moved to the position of the valve operation unit 300.

The vertical moving unit 420 moves the valve operation unit 300 along the y-axis direction against the platform 110 in FIG. 1.

The horizontal moving unit 330 moves the valve operation unit 300 along the x-axis direction in FIG. 1.

The vertical moving unit 420 and the horizontal moving unit 410, for example, may be a rail moving structure which uses a movable rail and a linear motor.

Any structure which can move the valve operation unit 300 along the Cartesian coordinate system is applicable to the vertical moving unit 420 and the horizontal moving unit 410.

The rotation operating unit 200 moves the position of the valve 120 on the x-z plane in FIG. 1 by rotating the platform 110.

As a result, the valve operation unit 300 can be moved against the valve 120 in the x-axis and y-axis, and valve 120 can be moved against the valve operation unit 300 in the z-axis.

Thus, it seems as if the valve operation unit 300 is moved at three-axis, so the valve operation unit 300 can be accurately positioned on the valve 120 that is intended to control.

Accordingly, the valve operation unit 300 is moved to the desired position according to the control operation of the controller 430, thus the valve 120 can be mechanically operated.

Hereinafter, a structure of the valve and the valve operation unit according to this embodiment is described by referring to FIG. 2.

In the description below, up or upper means upward along the y-axis direction and low or lower means downward along the y-axis direction.

The valve 120 may comprise a body 121 installed in the platform 110, a blocking plate 122 installed in the body 121 and positioned to face the flow channel 118 to selectively block the flow channel 118, a pressing rod 123 installed to be movable at the inside of the body 121 to press the blocking plate 122, and a fixing unit installed at the body 121 and fix the pressing rod 123 at a blocking plate pressing position.

The body 121 can be formed of a cylindrical shape whose upper end is opened.

And the blocking plate 122 can be installed at the inside of the lower end of the body 121.

The body 121 can be attached to the platform 110.

In addition, as shown in FIG. 2, a latch 125 can be formed at the lower end of the body 121, so that the body 121 can be detachably coupled with platform 110.

The first substrate 111 of the platform 110 may have a latched groove 126 which is fitted with the latch.

Therefore, if the latch 125 of the body is inserted into the latched groove 126 of the first substrate, the body 121 is installed so that it is fixed to the platform 110.

A protrusion 127 may be protruded at the lower end of the body 121 so that the body can press the blocking plate 122 towards the first substrate 111 and adhere to the first substrate 111 tightly.

The protrusion 127 is formed consecutively along the lower end of the cylindrical body 121.

Thus, when the body 121 is joined to the platform 110, the protrusion 127 protruded at the lower end of the body press the blocking plate 122 towards the first substrate 111 and attach it to the first substrate 111 of the platform tightly.

Thus, the blocking plate 122 and the first substrate 111 are closely adhered to, and are completely sealed between these two.

This prevents the flow of fluid along the flow channel from externally leaking through a gap between the blocking plate 122 and the first substrate 111.

The blocking plate 122 is elastically deformed by being pressed by the pressing rod 123, or returns to the original state. Due to these operations, it can open and close the flow channel 118.

Hereinafter, in the present embodiment, as shown in FIG. 2, a structure which closes the flows channel 118 when the blocking plate 122 is elastically deformed by being pressed by the pressing rod 123, and opens the flow channel 118 when the blocking plate 122 returns to its original state is described, as an example.

The blocking plate 122 may be formed of a material having elasticity to be elastically deformed by itself.

For example, the blocking plate 122 may be formed of elastic synthetic resin such as polydimethylsiloxane (PDMS), polybutadiene, butyl, polyisoprene, chloroprene, or at least one material selected from rubber or silicone.

In this embodiment, blocking plate 122 can be installed at the lower end of the body 121 and connected to the flow channel 118 of first substrate 111.

Thus, one surface of the blocking plate 122 faces to the inside of the body 121, and the other surface of the blocking plate 122 faces to the flow channel 118.

In addition to these structures, the blocking plate may be integrally formed with the first substrate 111.

The blocking plate 122 is elastically deformed by being pressed by the pressing rod 123 and blocks the flow channel 118.

When the fixation to the pressing rod 123 is released, the blocking plate 122 pushes the pressing rod by using its own elastic restoring force and recover its original state to open the flow channel 118 that is blocked.

Hereinafter, the position in which the pressing rod 123 presses and elastically deforms the blocking plate 122 to close the flow channel 118 is referred to fixing position, and the original position in which the fixation to the pressing rod 123 is released and the pressing rod 123 returns to its original state to open the flow channel 118 is referred to releasing position.

The blocking plate 122 blocks the flow channel 118 by being elastically deformed when the pressing rod 123 moves to the fixing position.

The pressing rod 123 is a bar-shaped structure having a predetermined length.

The pressing rod 123 is located inside the body 121 and when it moves along the up-and-down direction (y-axis direction in FIG. 2), the blocking plate 122 is pressed and deformed.

The pressing rod 123 may be formed of a cylindrical shape corresponding to the body 121.

In this embodiment, the pressing rod 123 may have a structure having circular cross-section as same as the body 121.

In this embodiment, the pressing rod 123 is a structure which presses and moves the blocking plate 122 by the linear reciprocating motion in the same direction as the direction of an external force.

The pressing rod 123 may be switched to any one of the fixing position for closing the flow channel 118 or the release position for opening the flow channel 118.

The upper end of the pressing rod 123 has a locking member 128 which is configured to be locked by the fixing unit.

When the locking member 128 at the upper end of the pressing rod 123 is locked by the fixing unit, the fixing position can be maintained.

The fixing unit locks the pressing rod 123 at the fixing position.

The fixing unit may comprise an elastic latch 124 which can be flexibly bended.

In this embodiment, the elastic latch 124 may be integrally formed with the body 121 at the side of body 121.

As shown in FIG. 2, the elastic latch 124 is configured to have a structure that the upper end is connected to the side of body 121 and lower end is free end, so that the elastic latch 124 can be flexibly bended.

The elastic latch 124 extend to incline towards the inside of the body 121, and the lower end which is free end is protrudes towards inner side of body 121. Accordingly, the locking member 128 of the pressing rod 123 can be locked and fixed.

The inner surface of the elastic latch 124 is inclined at a predetermined angle to form an inclined plane.

Accordingly, the locking member of the pressing rod can move smoothly along the elastic latch.

The elastic latch 124 may be formed in at least one location along the inner surface of the cylindrical body 121.

The elastic latch 124 can be formed by cutting the side of body 121.

For example, the elastic latch 124 may be formed by cutting the body 121 at three positions, and bending the lower end of the elastic latch towards inside of the body 121 with the upper end being connected to body 121.

When the pressing rod 123 is pressurized, the pressing rod 123 passes the lower end of the elastic latch 124 and move to the fixing position, and the blocking plate 122 is pressurized by the pressing rod 123 and the flow channel 118 is closed.

As the pressing rod 123 passes the elastic latch 124, the elastic latch 124 is elastically bended.

After the pressing rod 123 passes the elastic latch 124, the bended elastic latch 124 returns to its original state by its own elastic restoration.

Accordingly, the lower end of the elastic latch 124 protruding into the inner side of the body can lock the upper end of the locking member 128 of the pressing rod 123.

Therefore, the pressing rod 123 is blocked by the lower end of the elastic latch 124 and is stuck below the elastic latch 124, unable to move upwards, and is positioned in a fixing position to maintain the flow channel closing state.

And, the diameter of the locking member 128 (A) which is upper end of the pressing rod 123 may be smaller than the internal diameter of the body 121 (B) and larger than the internal diameter of the elastic latch 124 (C).

The internal diameter of the elastic latch 124 (C) means the size of diameter of the protruding lower end of an elastic latch 124 in the condition that external force do not applied to the elastic latch 124.

If the diameter of the locking member 128 (A) of the pressing rod 123 is greater than the internal diameter of the body 121 (B), it is difficult for the pressing rod 123 to move up and down from inside the body 121.

If the diameter of the locking member 128 (A) is equal to the internal diameter of the body 121, then the pressing rod 123 may deviate from the body 121 to outside through the open upper part of the body 121 when the pressing rod is released by enlarging the elastic latch 124, If the diameter of the locking member (A) of the pressing rod 123 is equal or less than the internal diameter of the elastic latch 124 (C), the pressing rod 123 cannot be locked by the lower end of the elastic latch 124.

In this case, the pressing rod cannot be fixed because the pressing rod 123 cannot be not caught by the elastic latch 124, and as a result the flow channel closing state cannot be maintained.

When the elastic latch 124 is enlarged outward, the restriction on the locking member 128 of pressing rod 128 will be released, and the pressing rod 123 can rise upward along the body 121.

Therefore, the pressing rod 123 is moved to the releasing position, and the flow channel is opened.

The valve 120 according to this embodiment has a structure that can prevents the pressing rod 123 escape from the body 121 to outside through the open upper end of the body 121 when the pressing rod 123 rises past the lower end of the elastic latch 124 to the releasing position.

To this end, a stepped holder 129 may be formed on the side of the pressing rod 123. The stepped holder 129 can be locked by the elastic latch 124, thus prevent the pressing rod 123 escape from the body.

As shown in FIG. 2, the stepped holder 129 protrudes from the side of the pressing rod in a position separated from the upper end of the pressing rod 123 by a predetermined distance.

The stepped holder 129 can be formed along the outer surface of the cylindrical pressing rod 123.

For example, the stepped holder 129 may be formed by making a dent in the side surface of pressing rod 123.

Thus, in the process of valve opening operation, when the elastic latch 124 is enlarged towards outside, the locking member 128 is unlocked from the elastic latch, and then the pressing rod 123 rises upward.

When the pressing rod 123 moves upwards, the stepped holder 129 formed on the side surface of the pressing rod 123 is locked by the elastic latch 124, and as a result the movement of the pressing rod is restricted.

Therefore, as the stepped holder 129 is locked by the elastic latch 124, the pressing rod 123 no longer moves upward and does not deviate from the body.

The side surface between the locking member 128 and the stepped holder 129 of the pressing rod 123 may form an inclined plane that gradually decreases in diameter as it moves downwards.

In this structure, when the pressing rod 123 goes down and the locking member 128 passes through the inner surface of the elastic latch 124, the locking member 128 can move more smoothly along the elastic latch 124.

The external diameter of the stepped holder 129 (D) is equal or smaller than the internal diameter of the body 121 (B) and larger than the diameter of the locking member 128 (A) of the pressing rod.

If the external diameter of the stepped holder 129 (D) is greater than the internal diameter of body 121 (B), the pressing rod 123 which has the stepped holder cannot be moved up or down inside the body 121.

If the external diameter of the stepped holder 129 (D) is equal or less than the diameter of the locking member 128 (A), when the elastic latch 124 is enlarged beyond the diameter of the locking member 128 of the pressing rod for unlocking the pressing rod, the stepped holder 129 also cannot be caught by the elastic latch 124, as a result the pressing rod 123 may deviate outside the body 121.

The valve operation unit 300 controls the opening and closing of the flow channel 118, by moving the pressing rod 123 to a fixing position or by returning it to the releasing position within the body 121.

By the valve operation unit 300, the pressing rod 123 is selectively located either in the fixing position or in the releasing position.

To this end, the valve operation unit 300 in this embodiment, may comprise a pressing unit that is configured to apply external force to the pressing rod of the valve so that the pressing rod is locked by the elastic latch and fixed, and releasing unit configured to release the pressing rod from fixed condition.

The valve operation unit is either coupled to the body of the valve, or moved to the upper side of the body of the valve according to the operation of the control equipment, and the valve operation unit may be configured to apply external force to the pressing rod located inside of the body.

The pressing unit may comprise a housing 310 located above the body 121 and has an open bottom, an electromagnet 312 installed within the housing 310, an electric current supplier 316 that applies current to the electromagnet 312, and a magnetic material 314 that is installed to be movable in the housing 310 and push the pressing rod 123 as it moves due to the magnetic force from the electromagnet 312 to moves the pressing rod 123.

The releasing unit comprises a driving unit 318 which is connected to the housing 310 and moves the housing 310 along the inside of body 121. The releasing unit has a structure enlarge the elastic latch 124 to the outwards.

The releasing unit may comprise a driving unit 318 which is connected to the housing 310 and moves the housing 310 toward inside of the body 121, wherein the releasing unit has a structure that enlarges the elastic latch outward.

To this end, when moving the pressing rod 123 to apply pressure, with the housing 310 fixed, the magnetic material 314 is pushed by the magnetic force of the electromagnet 312 to move the pressing rod 123. Meanwhile, when releasing the pressing rod 123, the housing 310 itself is moved and enlarge the elastic latch 124 towards outside, therefore the pressing rod 123 can be released.

The housing 310, for example, may be formed of a cylindrical shape as same as the body 121.

The housing 310 is formed to the extent that it can be inserted into the inside of the body 121.

In this embodiment, the diameter of lower end of the housing 310 (E), which heads for the body 121, is equal or smaller than the internal diameter of the body (B) and equal or larger than the diameter of the locking member (A) of the pressing rod 123.

Thus, the housing 310 can release the pressing rod 123 which is locked by the elastic latch 124 from the latched state by enlarging the elastic latch 124 beyond the diameter of the locking member 128 (A) of the pressing rod 123.

If the diameter of the lower end of the housing 310 (E) is greater than the internal diameter of the body 121 (B), it is difficult for the housing 310 to move inside of the body 121.

If the diameter of the lower end of the housing 310 (E) is less than the diameter of the locking member 128 (A), the elastic latch 124 will not be widened beyond the diameter of the locking member 128 (A), and therefore releasing the fixation of the pressing rod 123 for the elastic latch 124 is impossible.

The electromagnet 312 is installed so that it is fixed inside the housing 310.

The electromagnet 312 varies in polarity according to the direction of current applied.

An electric current supplier 316 is electrically connected to the electromagnet 312 and applies the required current to the electromagnet 312 according to the driving conditions.

The magnetic material 314 is shaped like a rod and is located to be movable inside the housing 310.

The magnetic material is a material that becomes magnetized in a magnetic field, for example, the magnetic material may be made of a common iron rod.

The magnetic material may be made of permanent magnets in addition to the iron rod.

The magnetic material 314 is magnetized and polarized by magnetic force of the electromagnet 312, attached to the electromagnet or pushed out from the electromagnet and moved within the housing.

Any material that can be attached to or pushed out of the electromagnet depending on the polarity of the electromagnet 312 can be applicable to the magnetic material 314

The magnetic material 314 is moved by the forces of attraction and repulsion resulting from changes in the polarity of the electromagnet 312 facing the magnetic material 314.

The magnetic material 314 is moved toward to the body 121 through the open bottom of the housing 310 and push the pressing rod 123 in the body 121.

In this embodiment, the diameter of lower end of the magnetic material 314 may be designed to the extent that the elastic latch 124 can be sufficiently large to be caught by the locking member 128 of the pressing rod.

For example, the diameter of lower end of the magnetic material 314 may be designed to be smaller than the diameter of the locking member 128 at the upper end of the pressing rod 123.

Accordingly, with magnetic material 314 in contact with locking member 128, the locking member 128 protrudes more outward than the magnetic material 314 so as to being locked by the lower end of the elastic latch 124.

A driving unit 318 is a component that moves the housing 310 up and down towards the body 121.

For example, the driving unit 318 may be a combination of a drive motor and a power transmission unit, wherein the power transmission unit reciprocate the housing 310 linearly by transferring the rotational force of the drive motor to the housing 310.

Or, the driving unit 318 may comprise a drive cylinder connected to the housing 310 and driven compressed or expanded.

Any of structure can be applied to the driving unit 318 without restriction if it is a structure capable of reciprocating the housing 310 linearly for the body 121.

Hereinafter, the process of valve operation of the microfluidic device according to this embodiment is described by referring to FIG. 3 and FIG. 4.

Figure 3:
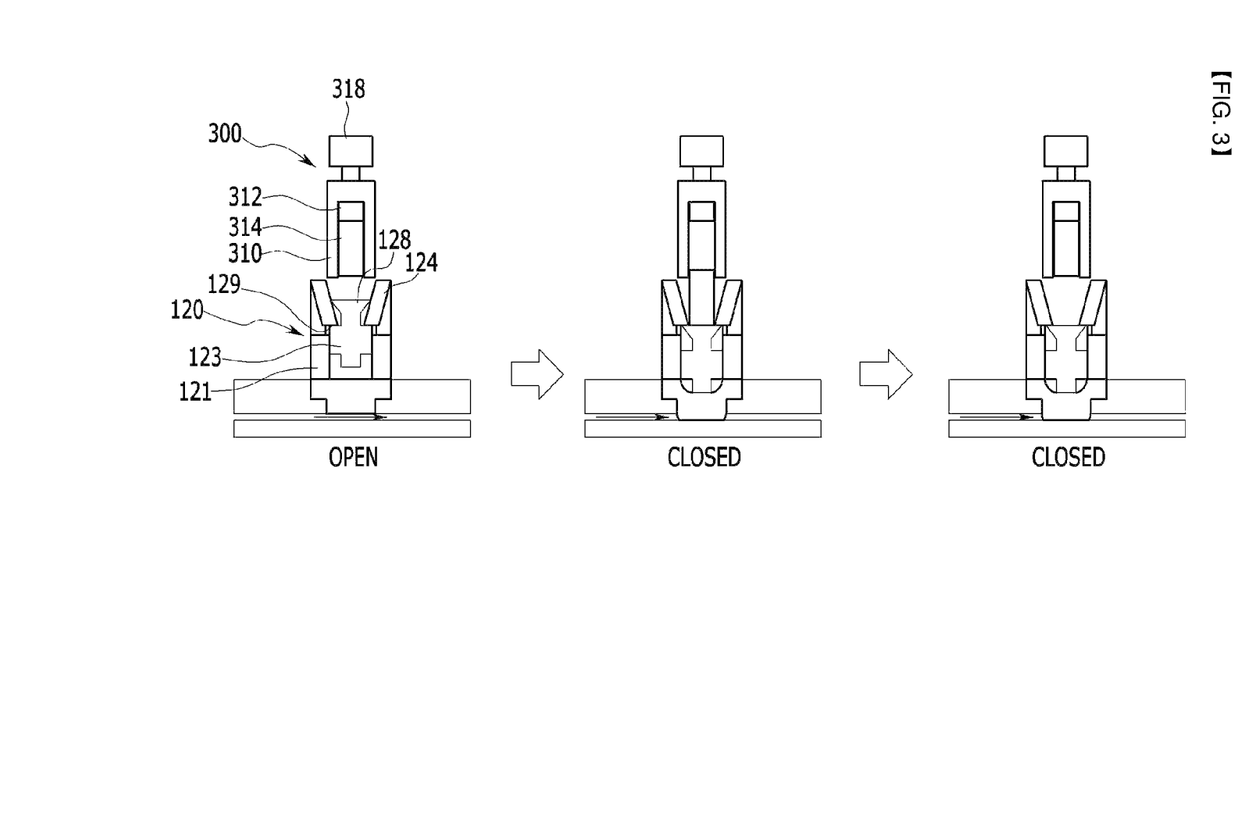
FIG. 3 and FIG. 4 are a schematic view to explain the operation procedure of the valve of the microfluidic device according to the present embodiment.

FIG. 3 shows the process of closing the valve.

As shown in FIG. 3, under the condition that the valve 120 is open, the pressing rod 123 is moved upwards and the blocking plate 122 is not pressurized.

The elastic latch 124 is contracted due to its own elastic force, and it locks the stepped holder 129 formed on the side of the pressing rod 123, therefore the pressing rod 123 is fixed within the housing 310.

The polarity of the electromagnet 312 which is equipped within the housing 310 of the valve operation unit 300 has been converted to the polarity that can apply the force of attraction to the magnetic material 314, so the magnetic material 314 is attached to the electromagnet 312.

When the valve closing operation is initiated, with the valve operation unit 300 being located at upper side of the body 121 of the valve 120, the magnetic material 314 is moved inside the body 121 and push the pressing rod 123 to move it towards the blocking plate 122.

When the polarity of the current applied to electromagnet 312 is switched, the electromagnet 312 applies the force of repulsion to magnetic material 314.

And then the magnetic material 314 is pushed out from the electromagnet 312 and is moved towards the body 121.

Therefore, the pressing rod 123 is pushed by the magnetic material 314 and is moved.

As the pressing rod 123 is moved, the blocking plate 122 located on the lower part of the pressing rod 123 is pressed by the pressing rod 123.

Thus, the blocking plate 122 is flexibly deformed to block the flow channel 118.

If the pressing rod 123 is sufficiently lowered to the condition which the flow channel is closed by the blocking plate 122, the pressing rod 123 is fixed by the elastic latch 124.

In other words, as the pressing rod 123 moves, the upper part of the locking member 128 passes through the elastic latch 124, during which the elastic latch 124 is enlarged flexibly.

When the pressing rod 123 is continuously pushed away by the magnetic material 314, and the locking member 128 completely passes the lower end of the elastic latch 124, the elastic latch 124 is contracted due to its own elastic return force.

Thus, the lower end of the elastic latch 124 moves above the locking member 128 of the pressing rod 123 and the the locking member 128 is locked by the elastic latch 124.

Therefore, the pressing rod 123 stays immobilized while it keeps pressing the blocking plate 122. This mechanism can keep the flow channel remain closed.

If the valve 120 is closed and the flow channel 118 is blocked, apply the force of attraction to the magnetic material 314 by changing the polarity of the current applied to the electromagnet 312 installed in the housing 310.

And then, the magnetic material 314 that was pressing the pressing rod 123 is attracted to the electromagnet 312 and moved back inside the housing 310.

As such, the valve 120 can be simply closed by controlling the current applied to the electromagnet 312.

Figure 4:
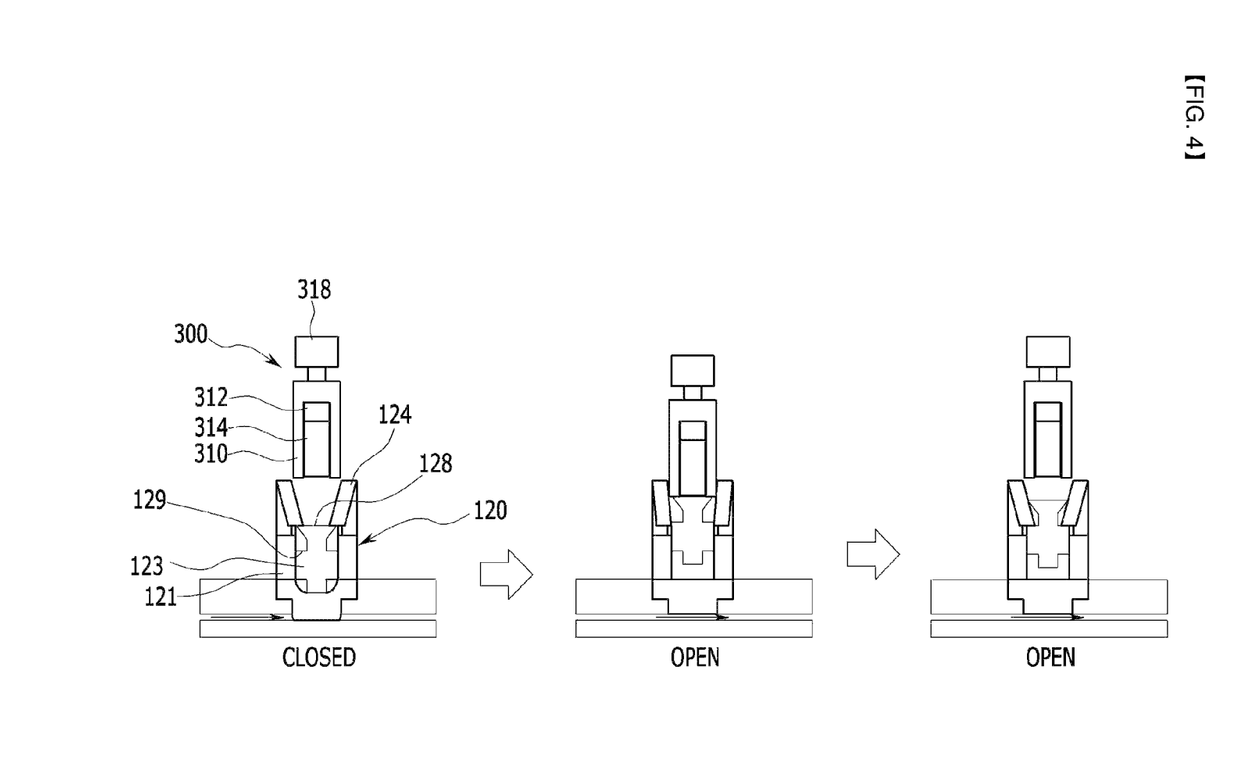

FIG. 4 shows the process of opening the valve.

As shown in FIG. 4, under the condition that the valve 120 is closed, the pressing rod 123 is moved downwards to pressurize the blocking plate 122, and the elastic latch 124 locks the locking member 128 of the pressing rod 123 to fix the pressing rod 123.

The polarity of the electromagnet 312 which is equipped within the housing 310 of the valve operation unit has been converted to the polarity that can apply the force of attraction to the magnetic material 314, so the magnetic material 314 is attached to the electromagnet 312.

When the valve opening operation is initiated, with the valve operation unit 300 being located at upper side of the body 121 of the valve, the housing 310 is moved inside of the body 121 to enlarge the elastic latch 124 towards outside.

The housing 310 is moved inside the body 121 by the operation of the driving unit 318.

Thus, the lower end of the housing 310 pushes the elastic latch 124 to enlarge it towards outside.

As the housing 310 continues to move inside the body 121, the elastic latch 124 widens further.

Because the diameter of the lower end of the housing 310 is greater than the internal diameter of the elastic latch 124, when the lower end of the housing 310 is moved to a certain extent inside the body 121, the internal diameter of the elastic latch 124 is enlarged beyond the diameter of the locking member 128 of the pressing rod 123.

As the lower end of the elastic latch 124 goes outside the locking member 128 of the pressing rod 123, the restriction on the pressing rod 123 is released.

Therefore, the pressing rod 123 is returns upwards by the elastic force of the pressed blocking plate 122, and the blocking plate 122 also restores its original position and opens the flow channel 118.

As the pressing rod 123 moves upwards along the body 121, the stepped holder formed on the side of the pressing rod is caught by the lower end of the elastic latch 124.

When the flow channel 118 is opened, the housing 310 returns to its original position by the driving unit 318.

Therefore, the housing 310 is moved from inside body 121 to the top.

As described above, according to this embodiment, by simplifying the valve structure, the opening and closing of the flow channel can be easily performed by simple operating manner.

Although the preferred embodiment of the present invention has been described above, the present invention is not limited thereto and can be performed by one of several variations within the claims, the description, and the accompanying drawings. It is also within the scope of the present invention.

While this invention has been described in connection with what is presently considered to be practical exemplary embodiments, it is to be understood that the invention is not limited to the disclosed embodiments.

On the contrary, it is intended to cover various modifications and equivalent arrangements included within the spirit and scope of the appended claims.

What is claimed is:

1. A microfluidic device comprising:
a platform having at least one chamber; at least one flow channel connected to the chamber and transfer fluid; and a valve which opens or closes the flow channel,
wherein the valve comprises a body installed in the platform, a blocking plate installed in the body and positioned to face the flow channel to selectively blocks the flow channel, a pressing rod installed to be movable at the inside of the body to press the blocking plate, and a fixing unit installed at the body and fix the pressing rod at a blocking plate pressing position and
wherein the fixing unit comprises an elastic latch installed at a side of the body, wherein a front end of the elastic latch is elastically urged towards the inside of the body to latch a front end of the pressing rod for fixing the pressing rod.

2. The microfluidic device of claim 1, wherein:
the front end of the pressing rod has a locking member which is configured to be locked by the elastic latch, and a diameter of the locking member is smaller than an internal diameter of the body and larger than an internal diameter of the elastic latch.

3. The microfluidic device of claim 2, wherein:
the pressing rod further comprises a stepped holder which is formed on a side of the pressing rod and configured to be locked by elastic latch to prevent the escape of the pressing rod.

4. The microfluidic device of claim 1, wherein:
wherein the blocking plate is made of material having elasticity, and being pressed and transformed by the pressing rod to open and close the flow channel.

5. The microfluidic device of claim 1,
further comprises a protrusion that protrudes from a lower end of the body and presses the blocking plate against the platform for tightly attaching.

6. The microfluidic device of claim 1,
further comprises a valve operation unit that open and close the flow channel by moving the pressing rod,
wherein the valve operation unit comprises a pressing unit that is configured to apply external force to the pressing rod of the valve so that the pressing rod is locked by the elastic latch and fixed, and a releasing unit configured to release the pressing rod from fixed condition.

7. The microfluidic device of claim 6, wherein:
the pressing unit comprises a housing located above the body and has an open bottom; an electromagnet installed within the housing; an electric current supplier that applies current to the electromagnet; and a magnetic material that is installed to be movable in the housing and push the pressing rod as it moves due to a magnetic force from the electromagnet to moves the pressing rod.

8. The microfluidic device of claim 7, wherein:
a diameter of a lower end of the magnetic material is smaller than a diameter of a locking member of the pressing rod.

9. The microfluidic device of claim 7, wherein:
the releasing unit comprises a driving unit which is connected to the housing and moves the housing toward inside of the body, wherein a diameter of a lower end of the housing, which heads for the body, is equal or smaller than an internal diameter of the body and equal or larger than a diameter of a locking member of the pressing rod, thus the housing enlarges the elastic latch outward as the housing moves into the inside of the body.

10. A control equipment for microfluidic device comprising:
a platform having at least one chamber; at least one flow channel connected to the chamber and transfer fluid; and a valve which opens or closes the flow channel,
wherein the valve comprises a body installed in the platform, a blocking plate installed in the body and positioned to face the flow channel to selectively block the flow channel, a pressing rod installed to be movable at the inside of the body to press the blocking plate, and an elastic latch installed at the side of the body, wherein a front end of the elastic latch is elastically urged towards the inside of the body to latch a front end of the pressing rod for fixing the pressing rod,
wherein the control equipment further comprises a valve operation unit for opening and closing the valve equipped with the microfluidic device, and a moving unit for moving the valve operation unit,
wherein the valve operation unit comprises a pressing unit that is configured to apply external force to the pressing rod of the valve so that the pressing rod is locked by the elastic latch and fixed, and a releasing unit configured to release the pressing rod from a fixed condition.

11. Control equipment for microfluidic device of claim 10, wherein:
the pressing unit comprises a housing located above the body and has an open bottom; an electromagnet installed within the housing; an electric current supplier that applies current to the electromagnet; and a magnetic material that is installed to be movable in the housing and push the pressing rod as it moves due to a magnetic force from the electromagnet to moves the pressing rod.

12. Control equipment for microfluidic device of claim 11, wherein:
a diameter of a lower end of the magnetic material is smaller than a diameter of a locking member of the pressing rod.

13. Control equipment for microfluidic device of claim 11, wherein:
the releasing unit comprises a driving unit which is connected to the housing and moves the housing toward inside of the body, wherein a diameter of a lower end of the housing, which heads for the body, is equal or smaller than an internal diameter of the body and equal or larger than a diameter of the locking member of the pressing rod, thus the housing enlarges the elastic latch outward as the housing moves into the inside of the body.

14. The microfluidic device of claim 4,
further comprises a valve operation unit that open and close the flow channel by moving pressing rod,
wherein the valve operation unit comprises a pressing unit that is configured to apply external force to the pressing rod of the valve so that the pressing rod is locked by the elastic latch and fixed, and releasing unit configured to release the pressing rod from fixed condition.

15. The microfluidic device of claim 5,
further comprises a valve operation unit that open and close the flow channel by moving pressing rod,
wherein the valve operation unit comprises a pressing unit that is configured to apply external force to the pressing rod of the valve so that the pressing rod is locked by the elastic latch and fixed, and releasing unit configured to release the pressing rod from fixed condition.

* * * * *